March 8, 1949.　　　　F. H. CORNELIUS　　　　2,464,072

PROCESS AND APPARATUS FOR EXCHANGING HEAT

Filed Nov. 15, 1943　　　　　　　　2 Sheets-Sheet 1

WITNESSES:

INVENTOR
Frank H. Cornelius.
BY
William R. Coley
ATTORNEY

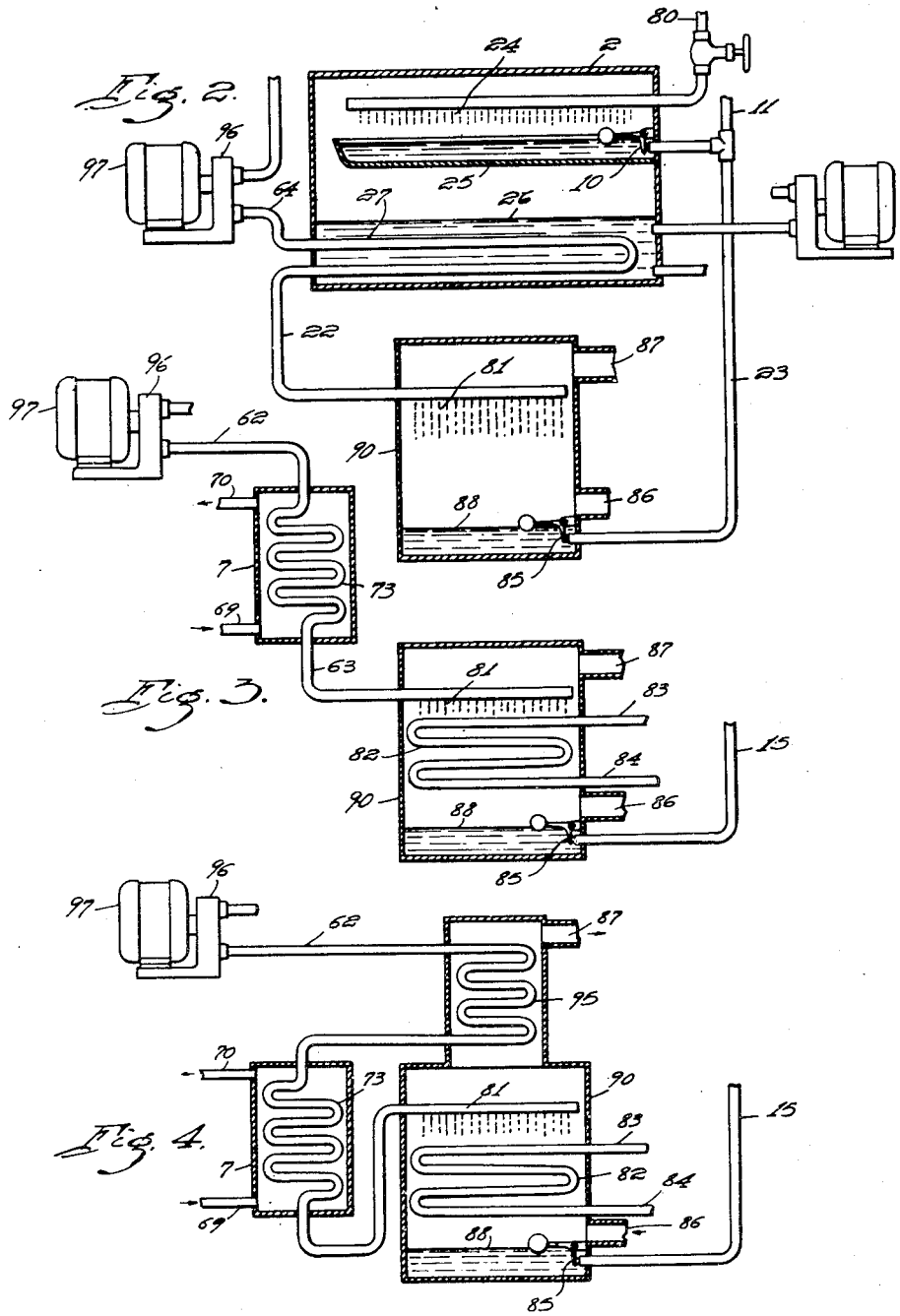

Patented Mar. 8, 1949

2,464,072

UNITED STATES PATENT OFFICE 2,464,072

PROCESS AND APPARATUS FOR EXCHANGING HEAT

Frank H. Cornelius, Lancaster, Pa.

Application November 15, 1943, Serial No. 510,350

14 Claims. (Cl. 62—179)

1

My invention relates to a heat exchange apparatus and process and in particular to the exchange of heat by means of a heat exchange solution at varying concentrations, temperatures and pressures.

This apparatus is continuation-in-part of my copending, but now abandoned application Serial No. 274,413, filed May 18, 1939, for "Heat engine and heat pump."

One object of my invention is to provide a relatively simple but effective apparatus for and method of utilizing a heat exchange solution for cooling or for heating, or for humidifying or dehumidifying, or for both.

A further object of my invention is to provide for concentrating a solution by flashing the solution through at least two temperature and pressure ranges using the heat of the temperature drop of the solution to evaporate a portion of the solvent from the solution, the evaporated solvent being utilized in heating the diluted solution prior to concentrating it.

Another object of my invention is to improve the thermal performance of an absorption refrigeration cycle.

A further object of my invention is to provide a multiple stage solution concentrator to provide a concentrated solution capable of picking up both sensible and latent heat at a temperature below the rejection temperature or the temperature of surrounding objects such as air or water.

Another object of my invention is to provide a multiple stage solution concentrator to deliver a solution to a conditioning unit capable of picking up water vapor and its latent heat from an air stream above its dew point.

These and other objects of my invention will become evident from the following detailed description taken in conjunction with the accompanying drawings, in which:

Figure 2 shows a modification of the apparatus of Figure 1 that is constructed and arranged to absorb both sensible heat and vapors from a gaseous medium;

Figure 3 shows a different modification of the apparatus of Figure 1 that is constructed and arranged to remove vapor from a gaseous medium and to increase or decrease the temperature of the gas; and, Figure 4 shows a modification of the apparatus of Figure 3.

Figure 1:
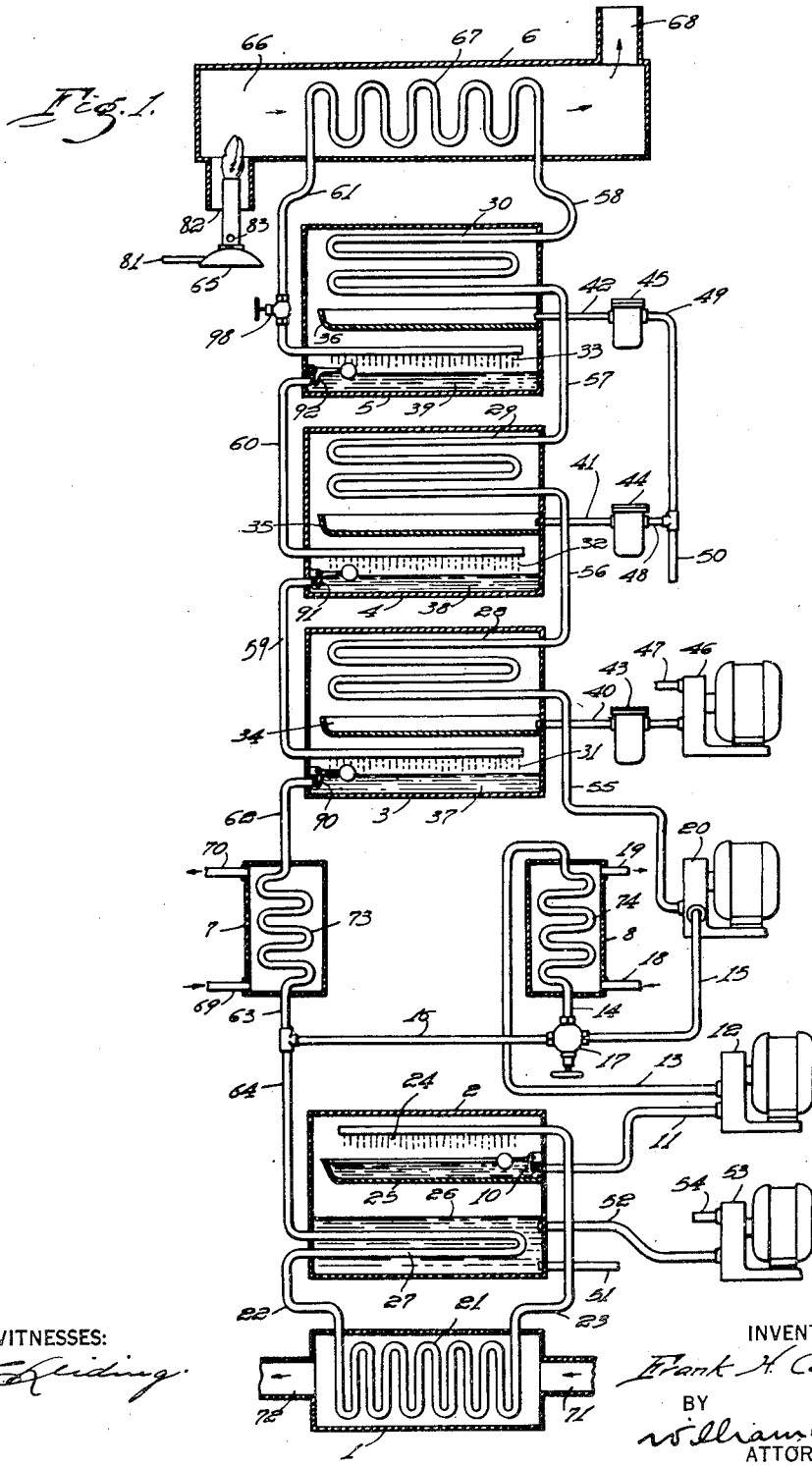
Figure 1 is a schematic drawing showing one embodiment of my invention which is adapted to cool by the absorption of sensible heat.

In practicing my invention, I provide a novel

2 apparatus through which a heat exchange solution is circulated and in which, for most application, the coefficient of performance may be greater than unity. In other words, the heat picked up may be greater than from the heat input. This will become more clear from the following detailed description.

My machine is quite unlike the typical absorption refrigerating machine, in that the more common machines have what is referred to as a regenerator or concentrator, usually a vessel heated by direct fire or a steam coil, and for the latent heat of every unit of solvent driven from the solution at least an equal amount of heat must be supplied to the solution from the steam coil or direct fire. There are other machines using two or more solutions, but in all these machines the heat absorbed or picked up in the absorber is less than the heat input to the generator or concentrator making the overall thermal efficiency less than unity.

Referring to Figure 1 of the drawings, the relatively dilute heat exchange solution absorbs sensible heat from the products of combustion in the exchanger 6 and passes down through concentrator stages 5, 4 and 3 which concentrate the solution. Heat is finally rejected from the concentrated solution to water or air in the exchanger 7. The relatively concentrated solution absorbs heat in the exchanger 1 and is then elevated to the diluter stage 2 where solvent vapors are added to the solution and heat is finally rejected from the diluted solution to water or air in the exchanger 8.

More specifically, my heat exchange cycle is as follows: A relatively dilute, cool solution in pipe 15, Figure 1, is delivered by pump 20 through pipe 55 to pipes or other exchanger surface 28 in the low stage concentrator 3. In this exchanger the solution absorbs the latent heat of the solvent condensed on the exterior of the exchanger surface. This solvent is boiled out of the more concentrated solution as it is flashed in the spray 31. In order for the solvent evaporated from spray 31 to condense on the exchanger 28, it is necessary that the vapor pressure of the solution in pipe 59 be sufficiently high that its saturation temperature is above the temperature of the dilute solution in the exchanger 28. The solution in pipe 15 is at lower temperature and is more dilute than the solution in pipe 59. The condensed solvent drips from the exchanger 28 into the condensate pan 34 from which it is removed by pipe 40. If the vapor pressure in concentrator 3 is below atmospheric pressure, it requires condensate and vacuum pump 46 to remove the condensate and any entrained air that exists. The trap 43 may or may not be used. Its function is to prevent the vacuum pump from handling vapor as well as condensate and air.

From exchanger 28 the solution is delivered through pipe 56 to exchanger 29 in the concentrator unit 4. Here the dilute solution receives additional latent heat in the exchanger 29 from the vapor condensed on its surface, this vapor being delivered from the flash spray 32. The concentrator unit 4 is similar to unit 3 except that it operates at a higher temperature and pressure level. If the vapor pressure in the unit 4 is above atmospheric pressure, then the condensate dripping from exchanger 29 into pan 35 will be forced through pipe 41, trap 44 and pipe 48 into pipe 50 and thence to the atmosphere, as well as any air entrained therein.

The dilute solution from exchanger 29 is delivered through pipe 57 to exchanger 30 within the concentrator unit 5. The solution further receives heat as it traverses the exchanger 30 due to the vapor flashed from spray 33 and condensed on the surface 30. The condensate collected in pan 36 is delivered through pipe 42, trap 45 and pipe 49 to pipe 50.

After the dilute solution leaves exchanger 30, it passes through pipe 58 to the exchanger 67. In the exchanger 67, the dilute solution absorbs additional heat from the products of combustion and receives the amount of heat that represents the input to this portion of the heat exchange cycle. This input heat is supplied by any suitable fuel, such as the Bunsen burner 65 as shown. The fuel is supplied through supply pipe 81 and mixed with air for combustion through primary hole 83 and secondary inlet 82. Combustion takes place within the combustion chamber 66. The products of combustion add sensible heat to the solution as they pass through the exchanger casing 6 and then discharge to the atmosphere through the stack 68. The input heat added to the solution in the exchanger 67 is that necessary to raise the vapor pressure of the solution so that the solution in pipe 61 has a vapor pressure sufficiently high that its saturation temperature is above the temperature of the solution within the exchanger 30, permitting the vapor flashed in the spray 33 to condense on the exchanger 30.

The solution 39 in concentrator unit 5, having flashed some of its solvent, is more concentrated and is cooler than when it entered unit 5 and is ready to flow to unit 4 where the pressure is lower than in unit 5 and is ready to be flashed in unit 4 giving up heat to the solution in exchanger 29. The solution 38 in unit 4 having flashed some of its solvent is more concentrated and is cooler than at 39 and ready to flow to unit 3, where it is further flashed delivering heat to the solution in exchanger 28. Thus, the solution is flashed in a plurality of stages at progressively lower pressures and temperatures and the latent heat of the flashed vapors is added to the relatively dilute solution flowing to the exchanger 6.

For efficient operating, it is essential that the solution be concentrated by flashing in at least two stages and preferably in three stages. The solution may, of course, be flashed through more than three stages.

The concentrated solution 37 in concentrator unit 3 is essentially at a higher temperature than the solution in exchanger 28. Since the solution in exchanger 28 is supplied by the solution in pipe 15 whose temperature is the head of heat exchange above the rejection temperature, then the sensible heat of the solution 37 above rejection temperature is no longer useful in doing work such as further concentration of the solution, it necessarily has to be rejected. This action is effected by the solution 37 leaving the unit 3 through pipe 62, then passing to the heat exchanger 7 where the heat is rejected to the surrounding air or water which enters the exchanger 7 through pipe 69, cooling the solution within the heat exchange surface 73, then leaving through pipe 70.

The concentrated solution leaves the exchanger 73 through pipe 63, and at the junction of pipes 63 and 16 it is mixed with the diverted, relatively dilute solution from the rejection heat exchanger 8.

The purpose of recirculating some of the solution in the pump cycle is to increase the mass of solution flowing through the heat exchanger 1 and diluter stage 2 in order to produce a thermal balance and so that the volume of solution flowing through the heat exchanger 1 and the diluter stage is greater than the volume flowing through the concentrator unit.

The solution in pipe 64 flows to the heat exchanger 27 within the diluter unit 2 where it is cooled as well as lowered in vapor pressure, thence through pipe 22 to the exchanger or heat pickup unit 1. The solution in traversing the heat exchanger 21 picks up heat from being in heat transfer relation with air or the like entering unit 1 through inlet 71 and discharged through outlet 72. This heat added to the solution within the exchanger 21 raises its temperature so that the solution in the discharge pipe 23 is warmer than that in pipe 22. The solution in pipe 23 enters the diluter unit 2 through spray 24 and is collected in pan 25, leaving the unit 2 through float valve 10 into pipe 11. The solution spray 24, even though higher in temperature than the water or other suitable solvent 26 fed into unit 2 through pipe 51, has a lower vapor pressure, causing boiling of the solvent 26 and cooling the latter due to the heat of evaporation coming from the solvent which in turn cools the solution in exchanger 27 to a temperature lower than its temperature in the rejection heat exchanger 7. The physical performance within the diluter unit 2 is substantially the reverse of that in the concentrator unit 3, 4 or 5.

The vacuum pump 53 removes air and a small quantity of solvent through pipe 52 and discharge pipe 54. The purpose of bleeding a small quantity of water or other suitable solvent is to prevent the solvent 26 from becoming concentrated due to traces of salts or other solutes it may contain.

The solution in pan 25 is warmer and more dilute than that sprayed at 24 by the amount of latent heat of the solvent absorbed from 26. This dilute solution leaving by pipe 11 is handled by pump 12 through pipe 13 into the rejection exchanger 8 where it is cooled by water or air entering the exchanger through pipe 18 and discharged through pipe 19, the solution being in heat transfer relation to the cooling medium through the heat surface 74. After the heat has been rejected from the solution in exchanger 8, it leaves through pipe 14 connecting to an adjustable three-way valve 17, diverting a portion into pipe 15 and recirculating the remainder through pipe 16.

The float control valves 90, 91 and 92 within the concentrator units 3, 4 and 5 are for the purpose of throttling the solution from a higher to a lower stage, as well as to liquid seal the stages, preventing vapors from flowing to a lower stage.

The valve 98 on pipe 61 is for the purpose of throttling the solution to the unit 5 so that the pressure and temperature drop of the solution will cause the solution to flash in unit 5.

The efficiency of that portion of the apparatus including the concentrator stages 3, 4 and 5, the heater 6 and the heat rejection means 7 will vary directly with the temperature range over which it works and the efficiency would be further improved by increasing the number of concentrator units.

The thermal performance of that portion of the apparatus including the diluter stage 2, the heat pickup unit 1 and the heat rejecting means 8 will vary inversely as the temperature range over which it works. Thus, it is necessary to divert a portion of the solution flowing from the rejection heat exchanger 8 and mix this diverted portion with the solution flowing from the rejection heat exchanger 7 so that this last-mentioned portion of the apparatus will operate over a relatively small temperature range and the first-mentioned portion including the concentrator stages will operate over a relatively wide temperature range. For low temperature refrigeration, it may require one or more diluter units such as unit 2.

Figure 2 is a schematic representation of a modification of the apparatus of Figure 1. The unit of Figure 2 is to be connected by pipes of like number to the apparatus shown in Figure 1. The essential difference from the corresponding unit shown in Figure 1 is that the solution comes in direct contact with the air or other gaseous medium being conditioned.

The solution in pipe 64 is delivered by pump 96, driven by means such as motor 97, through exchanger 27, pipe 22 to spray 81 in heat pickup and conditioning unit 90. The solution falls to the solution sump 88 during which time it comes into contact and direct heat exchange relation with the air entering inlet 86 and discharged through outlet 87. The diluted and heated solution 88 leaves the unit 90 through float control valve 85 into pipe 23 which connects to pipe 11, also shown on Figure 1.

The diluter unit 2 is for the purpose of cooling the solution in pipe 22 below the temperature of rejection so as to permit the solution to pick up sensible heat from the air below the surrounding temperature or rejection level temperature. The latent heat pickup level depends upon the concentration of the solution or, more specifically, upon its vapor pressure.

The pipe 80 supplying the solution to spray 24 in unit 2 in most cases would be connected to a source of solution having a lower vapor pressure than that in 23 such as to pipe 16, 64 or 63, depending upon the disposition of the sensible and latent heat load to which it is connected.

In the open system such as shown in Figure 2, the sensible and latent heat load may selectively be divided at will by controlling the temperature and vapor pressure of the solution. With a proper control system (not shown), the concentrator shown in Figure 1 driving the diluter apparatus shown in Figure 2 would approach the ideal system to follow the variable sensible and latent heat load encountered in most comfort and process air conditioning applications.

The apparatus of Figure 2 is not limited to air conditioning but may be used for cooling and for removing vapors other than water vapors from a gaseous medium. If the gaseous medium being conditioned is air, then the solution should be hygroscopic, but if other vapors are absorbed the solution should be so selected that at least some of the solvent and the vapors are the same and so that the solvent vapors flashed in stages 3, 4 and 5 are the same as the vapors absorbed in the conditioning unit 90.

Another, alternate modification of the apparatus of Figure 1 is shown in Figure 3 and is essentially a means of drying air though it may be used for drying or removing other solvent vapors from other gaseous mediums. In this system, the solution is not cooled below the rejection temperature but its vapor pressure may be sufficiently low to remove latent heat from the air being conditioned, so that the final dew point temperature of the air would be considerably below its dry bulb temperature. The absorbed vapors and their latent heat are removed and sensible heat is added to increase the dry bulb temperature of the air.

In operation, the solution after being cooled to within the head of heat exchange of the rejection medium in the rejection heat exchanger 7 is delivered through pipe 63 to the spray 81 within the heat pump pickup unit 90. The solution, as it falls through the pickup unit 90, comes in contact with heat exchanger 82, as well as with the air entering inlet 86 and leaving through discharge 87. There may or may not be any change in the dry bulb temperature of the air in passing through unit 90, depending upon the initial temperature of the air and the temperature of the rejection medium. If the sensible heat change in the air is small, then in order for the pump to handle any quantity of heat, it is necessary that the vapor pressure of the solution be somewhat below that of the air entering at inlet 86 to permit the solution to remove latent heat from the air. The solution in removing vapor from the air absorbs the latent heat thereof and in turn gives this latent heat up to exchanger 82. The exchanger 82 is the rejection exchanger and is within the pickup unit itself, the heat being rejected as it is picked up. The exchanger 82 has an inlet 84 and outlet 83, or vice versa, depending upon the air conditioning application.

The dilute solution 88 passes through float control valve 85 and pipe 15 to pipe of like number connecting to the concentrator units in Figure 1.

The dry air leaving at 87 in Figure 3 may be lowered in dry bulb temperature by an adiabatic spray or by heat exchange with well water or the like.

Figure 4 is a schematic representation of a modification of the apparatus of Figure 3.

The essential difference of the apparatus of Figure 4 over that of Figure 3 is that after the air or other gaseous medium has been conditioned in the pickup unit 90, it is heated by the exchanger 95. The exchanger 95 rejects partially or wholly the heat from the solution from concentrator unit 3 while the rejection exchanger 7 may or may not be used to further reject heat from said solution.

This type of apparatus has its principal application for conditioning air for drying materials.

In each modification of my apparatus, the relatively dilute solution is concentrated; heat is rejected from the concentrated solution; then the solution is diluted and latent heat or sensible heat or both are added to the solution and heat is rejected from the solution; and the solution is heated and then concentrated to complete the cycle.

The typical air conditioning application requires the removal of either or both sensible and latent heat from an air stream, while the typical, drying application in a closed drying system requires the removal of latent heat and the addition of sensible heat. This is due to the sensible heat loss through the walls of the dryer, plus the sensible heat loss of the material being dried as well as any conveyor equipment that may be used in carrying the material through the dryer. An adiabatic air dryer (not shown), such as would be connected to the heat pump in Figure 4, is usually operated at a temperature level above room temperature and the material as well as any conveying equipment would leave the drying at a temperature above the entering temperature requiring a sensible heat load of several percent of the total load.

The typical commercial adiabatic dryer uses outside air and heats it by any suitable means, then passes the air through the dryer, then rejects the moist air to the outside, losing its sensible heat as well as radiation and conduction losses and sensible heat losses of material and conveying equipment. Such equipment has a thermal efficiency, that is, the evaporative load divided by the heat of the fuel, in the neighborhood of 50%.

By employing my apparatus, it is quite possible to raise this thermal efficiency or coefficient of performance above unity.

The apparatus shown in Figure 1 or the modification shown in Figure 2 may be used for heating buildings or the like in winter by picking up heat from the outside air or water and elevating it and then rejecting to the room to be heated. The rejected heat from the concentrator portion may also be used for heating the room. The two heat rejection exchangers may be connected in parallel or in series with the medium heating the room.

The combination shown in Figure 1, when made completely closed, may be filled with an inert gas so as to eliminate pressure differences between the hot and cold ends of the system. The pump required to circulate the solution throughout the system would then only have to overcome frictional resistance of the fluid flow. The inert gas impairs heat exchange and since thermal efficiency is of prime concern of this system, which also is of more importance in larger units, it appears more practical to use the machine as shown for the larger heat loads.

When the previously referred to portion of the apparatus which includes concentrator stages 3, 4 and 5 operates over a large temperature range, the heat input exchanger surface 67, Figure 1, would be at a high temperature level effecting a relatively high temperature of the stack gases leaving outlet 68. A considerable portion of this stack loss could be recovered by passing them in heat exchange relation of heat exchangers inserted in pipes 60 and 59 in the order named, as well as 62 in the case of drying materials. It probably would be quite practical and with about the same efficiency to pass the stack gases over the concentrator units 5, 4 and 3 in the order named, as well as their associated piping.

The solutions that may be used in my apparatus may be any solvent and solute that would possess the proper physical characteristics for the heat exchange application and the temperature range over which the system operates. Solutes such as calcium chloride, lithium chloride, lithium bromide or glycerine may be suitable, while water is probably the best solvent for general use. More than one solvent and more than one solute may be used.

The entire system may be automatically controlled by suitable control equipment, depending upon the application of the system.

Control systems are not shown on account of the variable applications.

One or more of the following instruments may be used, as desired: Throttling valve, thermostat, vapor pressure control, viscosity control, fuel feed, pressurestat, pump speed, pump throttling, etc.

While I have illustrated different forms and applications of my invention, I do not wish to be restricted to the specific structure or arrangement of parts herein set forth, as other modifications thereof may be effected without departing from the spirit and scope of my invention. I desire, therefore, that only such limitations shall be imposed thereon as are indicated in the appended claims or as are indicated as essential in this description.

I claim:

1. Heat exchange apparatus through which a solution including solvent and solute is circulated, said apparatus comprising a heater for heating the relatively dilute solution flowing therethrough; concentrator means adapted to flash the heated solution from said heater in a plurality of stages at progressively lower pressures and temperatures whereby solvent vapors are removed from the solution; heat exchange means in heat exchange relationship with said solvent vapors for absorbing latent heat from said vapors to heat the relatively dilute solution flowing to said heater; means for rejecting heat from the flashed solution; means for adding heat to and diluting the solution; a second means for rejecting heat from the solution flowing from said diluting means to said heat exchange means; and pump means for circulating the solution through said apparatus.

2. In a heat exchange apparatus through which a refrigerant solution of varying concentrations of solvent and solute is circulated, the combination comprising a first heat rejection means for rejecting heat from such a concentrated solution flowing therethrough; a first heat exchanger adapted to further cool said concentrated solution by solvent evaporation from a body of solvent; diluter means for adding the vapor from said body of solvent to the solution, whereby the solution is heated and diluted; a second heat exchanger through which the solution flows from said first heat exchanger to said diluter means; a second heat rejection means for rejecting heat from the heated and diluted solution; means for concentrating the solution flowing from said second heat rejection means to said first heat rejection means; and means for circulating said solution through the apparatus.

3. A refrigerating, heat exchange apparatus adapted to cool or to cool and condition and through which a solution at varying concentrations and temperatures is circulated, said apparatus comprising in combination a heater for heating such a relatively dilute solution flowing therethrough; concentrator means adapted to flash the heated solution from said heater in a plurality of stages at progressively lower pressures and temperatures whereby solvent vapors are removed from the solution; heat exchange means adapted to absorb and add the latent heat from said vapors to the relatively dilute solution flowing to said heater; a first heat rejection means for rejecting heat from the flashed solution; a heat exchanger for further cooling the solution from said first heat rejection means; means for absorbing heat and solvent vapor whereby the solution is both heated and diluted; a second heat rejection means for rejecting heat from the heated and diluted solution of which at least a portion flows to said heat exchange means; valve-containing means selectively adjustable to divert a portion of the dilute solution flowing from said second heat rejection means and adapted to add said diverted portion to the solution flowing to said heat exchanger whereby the volume of solution flowing through said heat exchanger is greater than the volume flowing through said concentrator; and pump means for circulating said solution through said apparatus.

4. In a refrigerating apparatus through which a refrigerant of solute and solvent is circulated, the combination comprising means for confining a bath of such solvent; a heat exchanger, adapted to be in heat exchange relationship with said solution and said solvent bath; diluter means adapted to pass the solution through the vapors from said bath whereby latent heat and solvent are taken up by the solution to cool the solution in said heat exchanger; a refrigerating element through which the solution flows from said heat exchanger to said diluter means; and means operatively connected to both said diluter means and said heat exchanger for cooling and concentrating the solution.

5. In a refrigerating and air conditioning apparatus through which a hygroscopic solution of water and solute is circulated, said apparatus comprising a heat exchanger through which said solution flows; means for passing said solution through the atmosphere to be cooled and conditioned whereby the solution is heated and diluted; means for confining a bath of water in heat exchange relationship with said heat exchanger; means for passing a relatively concentrated, similar solution through the vapors from said bath and for adding said last-mentioned solution and vapors absorbed from said bath to the solution flowing from the means for passing the solution through the atmosphere whereby heat is absorbed from the solution flowing through said heat exchanger; and means for circulating said solution through said apparatus.

6. Heat exchange apparatus through which a heat exchange solution of solvent and solute is circulated and which is adapted to condition a gaseous medium by absorbing solvent vapors therefrom, said apparatus comprising a heater adapted to heat such a relatively dilute solution flowing therethrough; a concentrator adapted to flash the heated solution flowing from said heater in a plurality of stages at progressively lower pressures and temperatures whereby solvent vapors are removed from said solution; heat exchange means constructed and arranged to absorb the latent heat from said solvent vapors and to heat the relatively dilute solution flowing to said heater; a first heat rejection means for rejecting heat from the relatively concentrated solution flowing from said concentrator; a heat exchanger adapted to be in heat exchange relationship with a bath comprising the same solvent and through which the solution flows from said first heat rejection means; a conditioning unit through which the solution from said heat exchanger flows to absorb solvent vapors from the medium to be conditioned; diluter means for adding a similar solution to the solution from said conditioning unit, said diluter means being constructed and arranged to absorb the solvent vapors from said bath whereby the solution flowing through said heat exchanger is cooled below the rejection temperature; a second heat rejection means for rejecting heat from the solution flowing from said diluter means to said heat exchange means; adjustable flow control means adapted to divert a portion of the solution flowing from said second rejection means and add the diverted portion to the solution flowing to said heat exchanger from said first heat rejection means; and pump means adapted to circulate the solution through the apparatus.

7. In a heat exchange cycle wherein a heat exchange solution is recirculated, the steps comprising heating the solution; concentrating the heated solution by flashing the solution in a plurality of stages at progressively lower pressures and temperatures to remove solvent vapors therefrom; rejecting heat from the concentrated solution to cool it; diluting and adding heat to the cooled solution; rejecting heat from the diluted solution and cooling it to a temperature below the temperature of the solution in the last flashing stage; and thereafter adding the latent heat of said flashed vapors to the diluted relatively cool solution to complete the cycle.

8. In a heat exchange cycle wherein a refrigerant solution of solvent and solute is circulated at varying concentrations, the steps of rejecting heat from such a solution while in a relatively concentrated condition; further cooling the concentrated solution to below rejection temperature by bringing the solution into heat exchange relationship with a bath of solvent to evaporate solvent vapors therefrom; then adding heat and the solvent vapors from said bath to the solution to dilute and add heat to the solution; rejecting heat from the dilute solution; and finally concentrating the dilute solution.

9. A refrigerating process for cooling or for cooling and conditioning in which a solution is circulated at varying temperatures and concentrations, said process comprising the steps of adding sensible heat to the solution while in a relatively dilute condition; concentrating the heated solution by flashing it in a plurality of stages at progressively lower pressures and temperatures to remove solvent vapors; rejecting heat from the concentrated solution; further cooling the solution; adding both heat and solvent vapor to the solution whereby the solution is heated and diluted; rejecting heat from the diluted solution to cool it below the temperature of the solution in the final concentrating stage; adding the latent heat of the vapors removed during said concentrating step to a portion of the solution to complete the cycle; and adding the other portion of the solution to the concentrated solution before said further cooling whereby the volume of solution which is further cooled is greater than the volume of solution which is concentrated.

10. In a heat exchange cycle wherein a refrigerant solution of solvent and solute is recirculated, the steps comprising bringing such a solution into heat exchange relationship with a bath of solvent whereby solvent vapors are removed from said bath to cool said solution; adding sensible heat to the cooled solution; then adding the vapors from said bath to the heated solution whereby said solution is diluted; and then concentrating and cooling the solution to complete the cycle.

11. In a refrigerating and air conditioning cycle wherein a hygroscopic solution of water and solute is circulated, the steps comprising bringing said solution into heat exchange relationship with a bath of water whereby said solution is cooled by the evaporation of water vapor from said bath; passing the solution through the atmosphere to be cooled and conditioned whereby the solution is heated and diluted; passing a relatively concentrated similar solution through the vapors from said bath and then adding this last-mentioned solution and the absorbed vapors to the solution which has been heated and diluted by the atmosphere; and then concentrating and cooling the solution to complete the cycle.

12. In a heat exchange cycle wherein a heat exchange solution of solvent and solute is recirculated to condition a gaseous medium by absorbing solvent vapors and sensible heat therefrom, said cycle comprising the steps of heating the solution while in a relatively dilute condition; flashing the heated solution in a plurality of stages at progressively lower temperatures and pressures to concentrate the solution by removing solvent vapors; rejecting heat from the concentrated solution; bringing the solution into heat exchange relationship with a bath of solvent whereby the solution is further cooled; absorbing solvent vapors and sensible heat in the solution from the gaseous medium being conditioned; absorbing the vapors from said bath in a similar solution and adding this similar solution and the absorbed solvent vapors to the conditioning solution; rejecting heat from the combined solutions and cooling them to a temperature below the lowest temperature to which the solution is flashed; diverting a portion of the cooled solution and mixing it with the solution which is brought into heat exchange relationship with said bath; and finally adding the latent heat of the flashed vapors to the diluted relatively cool, remaining portion of the solution to complete the cycle, whereby the amount of solution which is brought into heat exchange relationship with said bath is greater than the amount of solution which is flashed.

13. In heat exchange apparatus adapted to absorb solvent vapors from a gaseous medium and through which a solution of solvent and solute is circulated, said apparatus comprising heater means for heating such a relatively dilute solution flowing therethrough; concentrator means adapted to flash the heated solution from said heater means in a plurality of stages to cool and concentrate the solution; heat exchange means adapted to utilize the latent heat of the vapors flashed from the solution by said concentrator means to heat the relatively dilute solution flowing to said heater means; means for rejecting heat from the concentrated solution; a conditioning unit adapted to bring the concentrated solution into contact with the gaseous medium to be conditioned whereby said solution is diluted by absorption of solvent vapors; means for rejecting at least a portion of the latent heat of the absorbed solvent vapors in the solution; and means for circulating the solution to said heat exchange means and through said combination.

14. In a heat exchange cycle wherein a solution of solvent and solute is recirculated to absorb solvent vapors from a gaseous medium, the steps comprise heating the solution; concentrating the heated solution by flashing the solution in a plurality of stages at progressively lower stages and temperatures to remove solvent vapors therefrom; rejecting heat from the concentrated solution to cool the solution; bringing the cooled solution into contact with the gaseus medium to be conditioned whereby the solution is diluted and heated by absorption of solvent vapors; rejecting heat from the diluted solution; and thereafter adding the latent heat of the flashed vapors to the diluted solution to complete the cycle.

FRANK H. CORNELIUS.

REFERENCES CITED

The following references are of record in the file of this patent:

UNITED STATES PATENTS

| Number | Name | Date |
| --- | --- | --- |
| 1,799,478 | Peebles | Apr. 7, 1936 |
| 2,062,771 | Stead | Dec. 1, 1936 |
| 2,272,856 | Thomas | Feb. 10, 1942 |
| 2,273,108 | Hibberd | Feb. 17, 1942 |
| 2,290,465 | Crawford | July 21, 1942 |